US006886801B2

(12) United States Patent
Hallbäck et al.

(10) Patent No.: US 6,886,801 B2
(45) Date of Patent: May 3, 2005

(54) VALVE ASSEMBLY

(75) Inventors: Mangus Hallbäck, Bromma (SE); Åke Larsson, Järfálla (SE); Fredrik Jalde, Bromma (SE)

(73) Assignee: Maquet Critical Care AB, Solna (SE)

( * ) Notice: Subject to any disclaimer, the term of this patent is extended or adjusted under 35 U.S.C. 154(b) by 0 days.

(21) Appl. No.: 10/609,506

(22) Filed: Jun. 30, 2003

(65) Prior Publication Data

US 2004/0021108 A1 Feb. 5, 2004

(30) Foreign Application Priority Data

Jul. 30, 2002 (SE) .............................................. 0202336

(51) Int. Cl.[7] .............................................. F16K 31/06
(52) U.S. Cl. ................................... 251/129.15; 251/65
(58) Field of Search ....................... 251/129.01–129.22, 251/65, 318–334

(56) References Cited

U.S. PATENT DOCUMENTS

| | | | | |
|---|---|---|---|---|
| 4,682,235 A | * | 7/1987 | Chism, Jr. ................... | 348/362 |
| 4,889,039 A | * | 12/1989 | Miller .......................... | 92/140 |
| 5,587,617 A | | 12/1996 | Dunfield et al. | |
| 5,783,886 A | | 7/1998 | Hong | |
| 5,787,924 A | | 8/1998 | Cewers et al. | |
| 6,078,235 A | * | 6/2000 | Schebitz et al. ............. | 335/220 |
| 6,220,831 B1 | * | 4/2001 | Shiokawa et al. ........ | 417/423.4 |
| 6,378,839 B2 | * | 4/2002 | Watanabe et al. ....... | 251/129.11 |
| 6,543,477 B2 | * | 4/2003 | Bauer et al. ................. | 137/554 |
| 2002/0059956 A1 | * | 5/2002 | Bauer et al. ................. | 137/554 |

FOREIGN PATENT DOCUMENTS

DE     OS 198 21 741     11/1999

OTHER PUBLICATIONS

Patent Abstracts of Japan Publication N, 200229455 For Japanese Application No. 2001095715.
Patent Abstracts of Japan Publication N, 2001324436 for Japanese Application No. 2000140178.

* cited by examiner

Primary Examiner—Paul J. Hirsch
(74) Attorney, Agent, or Firm—Schiff Hardin LLP

(57) ABSTRACT

A valve assembly has a valve opening which can be sealed and un-sealed by movement of a membrane 6, a force generator, such as an electromagnetic force generator having a solenoid and armature arrangement, and a shaft that is operably connected to the membrane and which is movable along a movement axis under the influence of the generated force to move the membrane and thereby regulate the degree of opening of the valve. Bearing assemblies are provided to procure a magnetic suspension of the shaft, permit its movement along the axis, and also to optionally produce a magnetic biasing of the shaft in a direction along the axis, particularly in the absence of a generated force.

8 Claims, 3 Drawing Sheets

VALVE ASSEMBLY

BACKGROUND OF THE INVENTION

1. Field of the Invention

The present invention relates to a valve assembly and in particular to an assembly of the type in which regulation of the flow of fluid through the valve is achieved by means of translational and/or rotational movement of a shaft to seal or un-seal a valve opening in response to an applied force from an associated force generator.

2. Description of the Prior Art

In a valve assembly having a mechanically journaled shaft friction in the bearing can cause problems. One of the most common is that frictional forces often cause the shaft to stick in a particular position so that a change in the force applied to the shaft in order to move it to another position can have unpredictable results. Moreover, the magnitude of the frictional force itself is often unpredictable, since it may change with the age of the valve, the pressure of the shaft against the bearing or with movement of the shaft within the bearing in a direction not associated with the sealing or un-sealing of the valve opening, so that the force from the force generator which must be applied to the shaft in order to overcome the frictional force can be unpredictable.

In the remainder of the this application a force generator of the solenoid type will be described in more detail in connection with the valve assembly of the present invention. Those skilled in the art will appreciate that the valve assemblies in the description may be modified to apply to other assemblies that employ different force generators acting on the shaft so as to effect the required movement without departing from the invention.

It is known from U.S. Pat. No. 5,787,924 to provide a valve assembly in which a shaft is movable along the coil axis of a solenoid coil type force generator. A controller is provided which operates to vary the current through the coil to vary an electromagnetic force exerted on the shaft and thereby cause its translation to a desired position. The controller then operates to impose an additional oscillatory current to exert an additional, oscillatory force of a predetermined maximum magnitude on the shaft and cause a sympathetic oscillation of the shaft about the desired position by amounts sufficiently small so as not to adversely effect the flow control operation of the valve. This continuous oscillatory motion is designed to prevent the shaft sticking in the mechanical journal arrangement. The maximum amplitude of this additional force may even be made to be dependent, in a known manner, on the magnitude of an error signal representing the known position of the shaft and the desired position.

SUMMARY OF THE INVENTION

An object of the present invention is to provide a valve assembly that at least minimizes the problems associated with known valve assemblies, as discussed above.

This object is achieved in accordance with the invention in a valve assembly having a valve body with a valve opening therein, a force generator that is energizable to generate force, a shaft on which the force generated by the force generator acts, said shaft being movable relative to the valve opening in response to the force in a direction to regulate a degree of opening of the valve, and a bearing assembly in which the shaft is guided for movement relative to the valve opening, the bearing assembly including a magnetic arrangement configured to produce a magnetic suspension of the shaft.

By replacing the mechanical bearing which guides the movable shaft with a magnetic bearing, either active or passive or a combination of the two, the frictional force between the movable shaft and the bearing is effectively eliminated. The need for sophisticated means for controlling friction between the shaft and the bearing is thus obviated.

Additionally, the magnetic bearing may be configured to act on the movable shaft to produce a magnetic biasing toward either closing or opening the valve, as desired, in the absence of a force applied to the shaft by the force generator. This has the advantage that magnetic bearing can replace or augment biasing means typically employed in a valve assembly to be used in safety critical applications, such as an inspiration or an expiration flow control valve in a pneumatic circuit of a conventional mechanical ventilator, where for patient safety reasons it is preferable that, respectively, the valve closes or opens in the event of a failure of the force generator.

DESCRIPTION OF THE PREFERRED EMBODIMENTS

Figure 1:
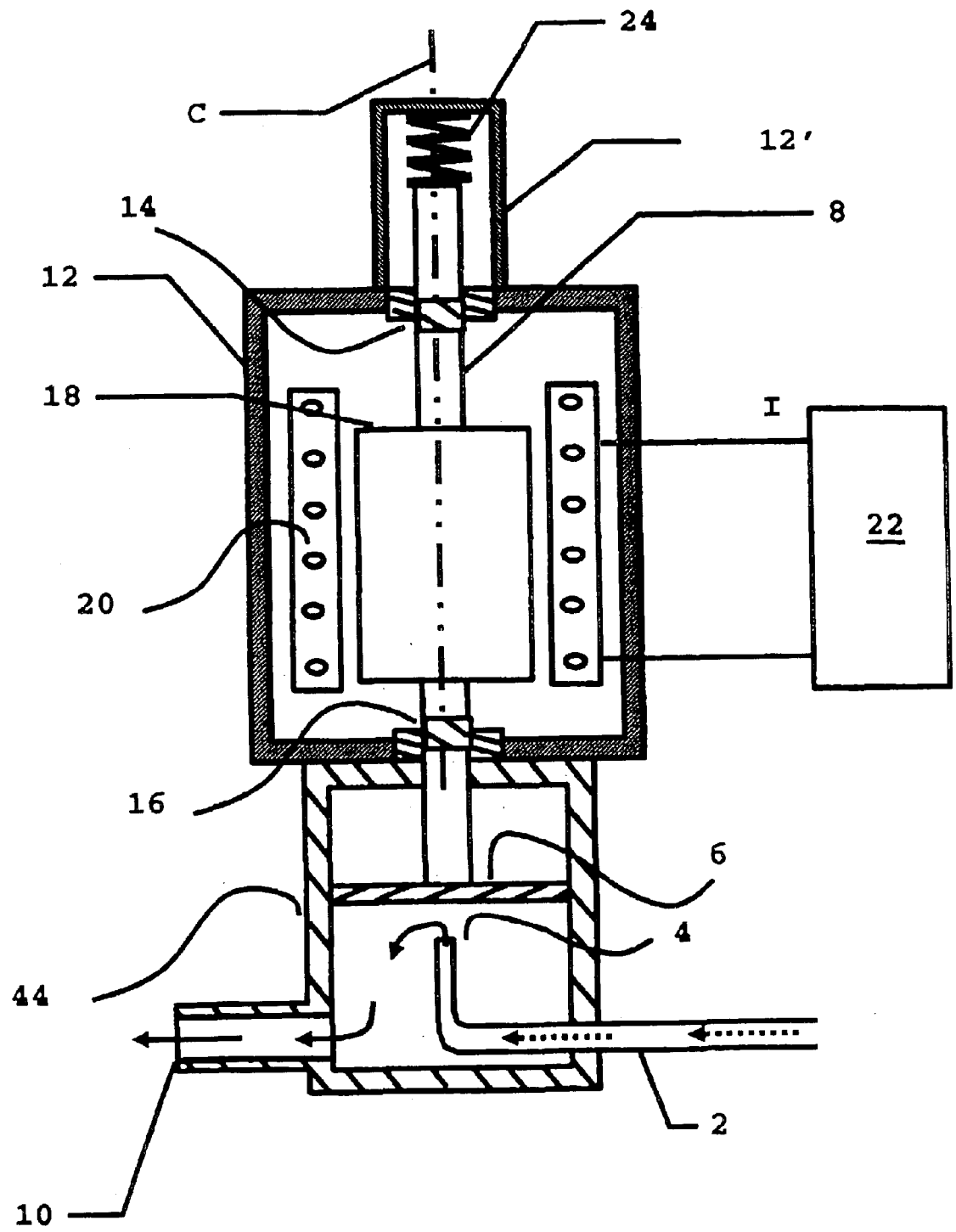
FIG. 1 is a schematic representation of a valve assembly according to the present invention.

As shown in FIG. 1, an electromagnetic valve assembly has a valve 44 with an inlet 2, the opening 4 of which can be opened and closed with a membrane 6.

The membrane 6 is elastically resilient. To close the valve 44, a movable shaft 8 pushes the membrane 6 against the opening 4. To open the valve 44, the movable shaft 8 retracts, (upward in FIG. 1), whereupon the membrane 6 moves resiliently away from the opening 4, to allow a flow through the inlet 2, via the opening 4, and out through an outlet 10.

The movable shaft 8 passes through an enclosure 12 and is supported in magnetic bearing assemblies 14 and 16 for movement in its longitudinal direction along a movement axis that is, in the present example, the coil axis C (an axis of symmetry of a solenoid coil 20 along which it is wound). The bearing assemblies 14, 16 thus serve to guide the movable shaft 8.

An armature 18 made of magnetic material is fixed on the movable shaft 8 and is located inside the solenoid coil 20. The armature 18 together with the solenoid 20 forms, in the present example, a force generator which when energized is able to move the movable shaft 8. Thus, when an appropriate current, I, is supplied from an associated current control unit 22 to energize the coil 20 the armature 18 and accordingly the movable shaft 8 can be, in the present embodiment, made to reciprocate parallel to the coil axis, C. It will be appreciated that a so-called "voice coil" arrangement, in which a solenoid is attached to the movable shaft 8 in place of the armature 18 of the present example and a permanent magnet replaces the static solenoid coil 20 of the present example, may substitute for the force generator described above without departing from the invention.

The valve's degree of opening, i.e. the magnitude of the distance between the opening 4, serving as a valve seat, and the membrane 6 therefore can be regulated by the control unit 22 through varying the current, I, supplied to energize the solenoid coil 20.

As an alternative to providing a separate armature 18 arranged on the movable shaft 8, at least a part of the movable shaft itself can be made of a magnetic material that then serves as the anchor. As a further alternative, the movable shaft 8 can be coated, at least in part, with magnetic material.

For safety reasons, it may be preferable to have the movable shaft 8 biased by a biasing arrangement, here by a spring 24, so that the valve 44 returns to a default position as the current I to the coil 20 is shut off. The biasing arrangement 24 in the present example is contained in an extension 12' to the housing 12 and operates to bias the movable shaft 8 to push the membrane 6 against the valve opening 4 and closes the valve 44 in the absence of the current I. This is particularly useful when the valve 44 is used as an inspiration flow control valve in a pneumatic circuit of a conventional mechanical ventilator. In circumstances in which the valve 44 is employed as an expiration flow control valve in a pneumatic circuit of a conventional mechanical ventilator then the biasing arrangement preferably is provided to establish an opening position of the valve in the absence of the current I to the coil 20.

Figure 2:
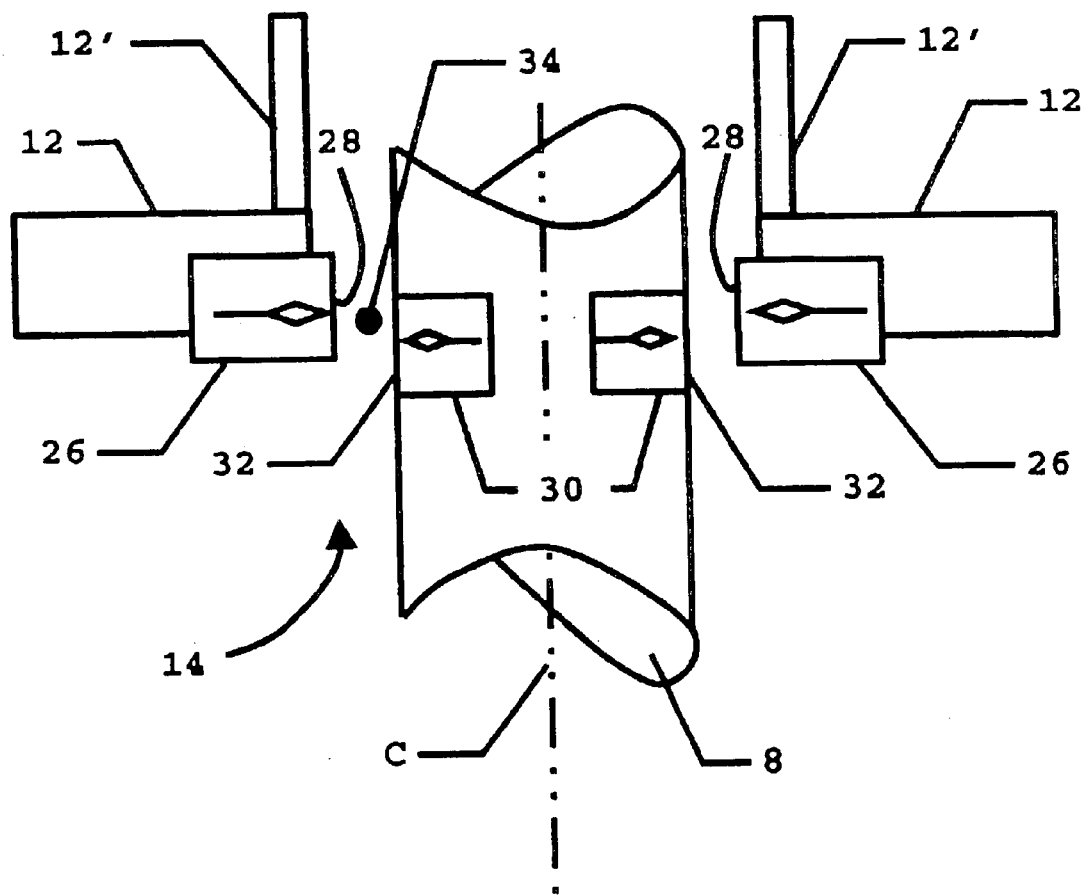
FIG. 2 shows in greater detail a magnetic bearing arrangement according to the present invention, employed in the valve assembly of FIG. 1.

A region of the valve assembly that includes the magnetic bearing assembly 14 employed in the present embodiment is shown in greater detail in FIG. 2. It will be appreciated that the following description is equally applicable to the magnetic bearing assembly 16. The bearing assembly 14 includes a first, typically permanent magnet, static magnet 26. This static magnet 26 is shown in the present example as a ring magnet, either continuous or segmented, attached to a section of the housing 12, and is provided with a pole face 28 directed toward the movable shaft 8. Also included in the bearing assembly 14 is a second, typically permanent magnet, magnet 30, that may also be a ring magnet, mounted on the movable shaft 8 and provided with a pole face 32 directed toward the pole face 28 of the first magnet 26. In the example of the bearing assembly 14 illustrated in FIG. 2, the pole faces 28,32 are orientated with the same magnetic pole facing one another. Thus, a radial magnetic repulsive force between the co-operating magnet arrangement 26,30 of the bearing assembly 14 procures a magnetic suspension of the shaft 8 within the static magnet 26 to maintain the shaft 8 separated from the pole face 28 of that magnet 26 by a small air gap 34 as the shaft (8) moves to regulate the degree of opening of the valve 44.

In addition to the radial magnetic force described above an axial magnetic force (that is, parallel to the coil axis C) is also generated by the interaction of the magnetic fields of the co-operating magnet arrangement 26,30 of the magnetic bearing assembly 14 (and also for the similar co-operating magnet arrangement of the magnetic bearing assembly 16). This axial magnetic force will vary as the movable shaft 8 moves along the axis C. By appropriate selection of magnetic pole 28,32 and of the relative axial locations of the magnets 26,30, the axial magnetic force produced by the co-operating magnet arrangement 26,30 of the bearing assembly 14 (and also of the assembly 16) may be employed to produce the biasing force which, in the exemplary embodiment of FIG. 1, is provided by the spring 24. This provides, as desired, either a default open position or a default closed position of the membrane 6 with respect to the valve opening 4 in the absence of current, I, to the coil 20.

Figure 3:
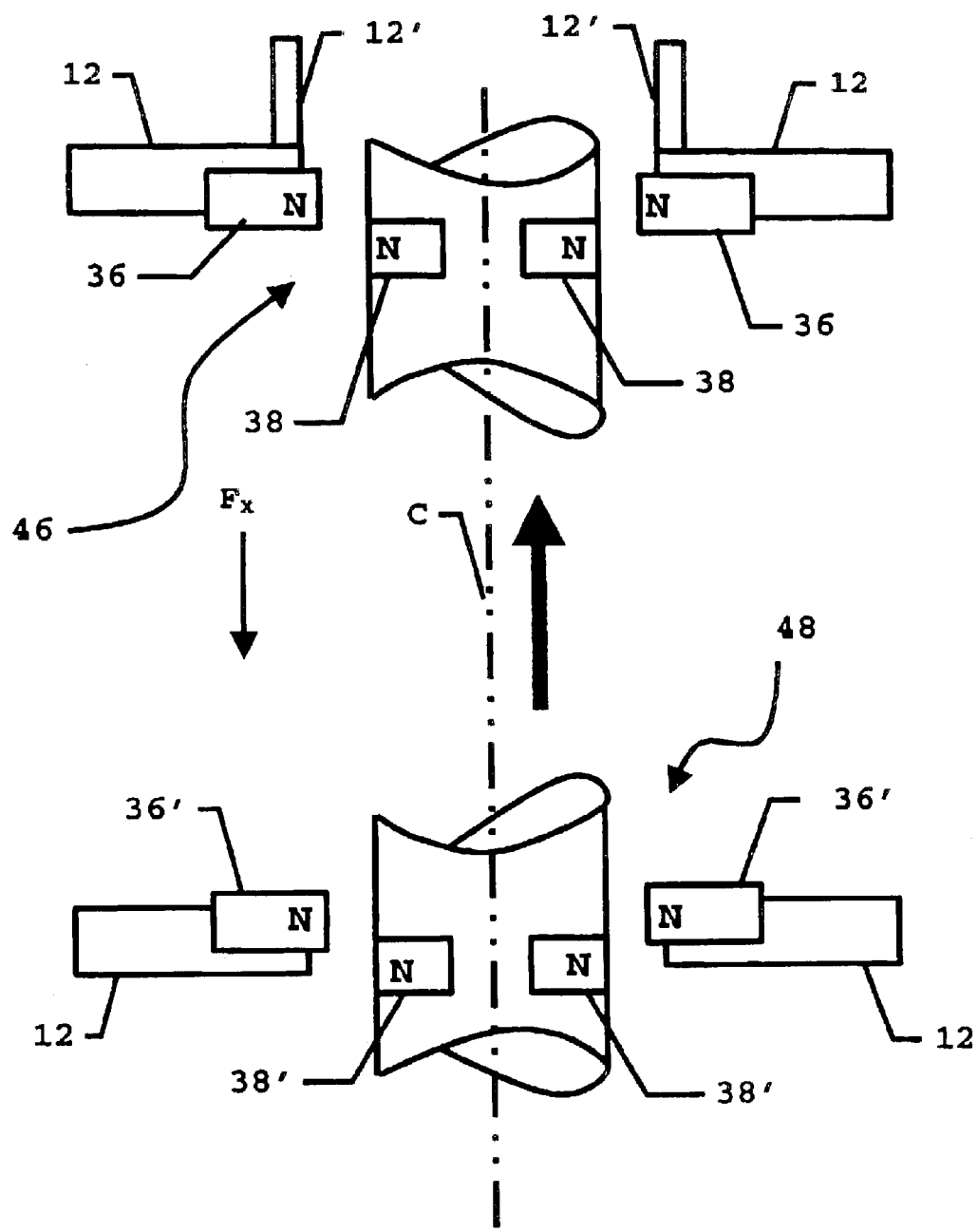
FIG. 3 shows a magnetic bearing arrangement usable in a valve assembly according to the present invention to produce a desired magnetic biasing effect.

One possible arrangement of magnets that may constitute the magnetic bearing assemblies 14,16 of the valve assembly of FIG. 1 is illustrated in FIG. 3. This arrangement, as described below, procures an axial magnetic bias force FX acting in a direction along the movement axis (here the solenoid axis C) and, in the present example, acts in a manner equivalent to the bias force generated by the spring 24 of the valve assembly shown in FIG. 1. With reference to FIG. 3, a first bearing assembly 46 has a first magnet 36 fixedly located at a wall of the housing 12 and a second magnet 38 mounted on the movable shaft 8. The first and second magnets 36,38 are disposed so that the same magnetic pole (shown in the embodiment as a north pole, N) of each magnet 36,38 is facing one another. Similarly, a bearing assembly 48 has a third magnet 36' fixedly located at a wall of the housing 12 and a fourth magnet 38' mounted on the movable shaft 8. The third and fourth magnets 36',38' are disposed so that the same magnetic pole (shown in the embodiment as a north pole, N) on each magnet 36',38' is facing one another and, in the present example, is selected to be is the same as the facing poles of the other bearing assembly 46.

The magnets 38,38' are positioned on the movable shaft 8, relative to the complementary magnets 36,36' that make up the co-operating magnet arrangement of each associated bearing assembly 46,48 such that an axial magnetic repulsive force between the co-operating magnet arrangement 36,38 and between the co-operating magnet arrangement 36',38' increases as the shaft 8 moves (in the direction of the larger arrow of FIG. 3) to open the valve 44. Thus, the axial magnetic bias force, FX, is procured which increases as the valve 44 opens (that is the shaft 8 moves in the direction of the larger arrow) and which acts to bias the shaft 8 always towards closing the valve (that is in the direction of the smaller arrow), even in the absence of a current I through the coil 20. In this manner the magnetic bearing can replace or augment the biasing arrangement 24 that is present in the embodiment of FIG. 1.

It will be appreciated by those skilled in the art that the direction and magnitude of the magnetic bias force FX may be readily selected through suitable choice of one or both of the orientation of the poles and the relative physical locations of the magnets 36,38;36',38' that constitute the respective magnetic bearing assemblies 46;48. Moreover, it will be appreciated that although the magnetic bearing assemblies 14;16,46;48 described herein all employ only permanent magnet arrangements some or all may be exchanged for electro-magnet arrangements whilst remaining within the scope of the invention as claimed. The use of such electromagnets has an advantage that magnitudes of one or both the suspension (here radial) and the bias (here axial) magnetic forces may be controlled by varying the current flowing to the electromagnets.

Although modifications and changes may be suggested by those skilled in the art, it is the intention of the inventors to embody within the patent warranted hereon all changes and modifications as reasonably and properly come within the scope of their contribution to the art.

We claim as our invention:

1. A valve assembly comprising:

a valve body having a valve opening therein;

an electromagnetic force generator comprising a solenoid coil having a coil axis, said solenoid coil being energizable to generate an electromagnetic force;

a shaft in operable connection with said electromagnetic force generator and disposed for reciprocal movement in a direction parallel to said coil axis in response to said electromagnetic force to regulate so as to be movable relative to said valve opening dependent on said electromagnetic force to regulate a degree of opening of said valve opening; and a bearing assembly guiding said shaft in said movement relative to said valve opening, said bearing assembly comprising a magnet arrangement disposed to magnetically suspend said shaft.

2. A valve assembly as claimed in claim 1 wherein said magnet arrangement additionally magnetically biases said shaft in a direction to regulate said degree of opening of said valve opening.

3. A valve assembly as claimed in claim 2 wherein said magnet arrangement magnetically biases said shaft to decrease said degree of opening of said valve opening.

4. A valve assembly as claimed in claim 2 wherein said magnet arrangement magnetically biases said shaft to increase said degree of opening of said valve opening.

5. A valve assembly comprising:

a valve body having a valve opening therein;

a force generator energizable to generate a force;

a shaft in operable connection with said force generator so as to be movable relative to said valve opening dependent on said force to regulate a degree of opening of said valve opening; and a bearing assembly guiding said shaft in said movement relative to said valve opening, said bearing assembly comprising a magnet arrangement disposed to magnetically suspend said shaft and to additionally magnetically bias said shaft, separately from said force, in a direction to regulate said degree of opening of said valve opening.

6. A valve assembly as claimed in claim 5 wherein said force generator is an electromagnetic force generator comprising a solenoid coil having a coil axis, said solenoid coil being energizable to generate an electromagnetic force, and wherein said shaft is disposed for reciprocal movement in a direction parallel to said coil axis in response to said electromagnetic force to regulate said degree of opening of said valve opening.

7. A valve assembly as claimed in claim 5 wherein said magnet arrangement magnetically biases said shaft to decrease said degree of opening of said valve opening.

8. A valve assembly as claimed in claim 5 wherein said magnet arrangement magnetically biases said shaft to increase said degree of opening of said valve opening.

* * * * *